INVENTORS
HERMANN E. F. C. LINGENBRINK
ALBERT LA BOV
BY

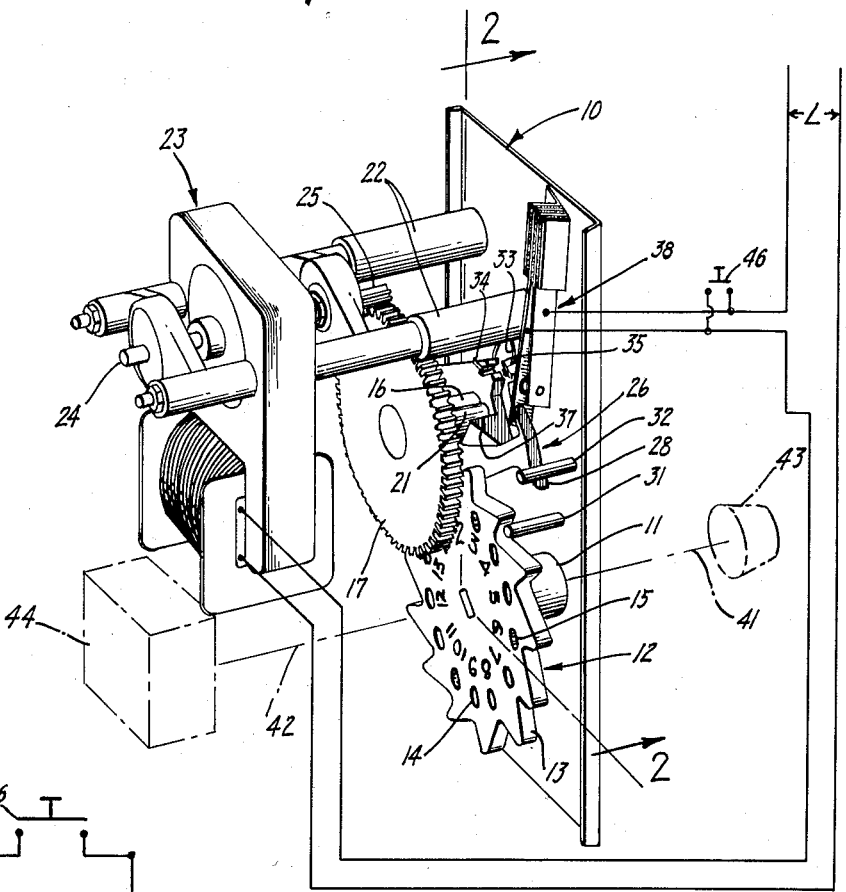
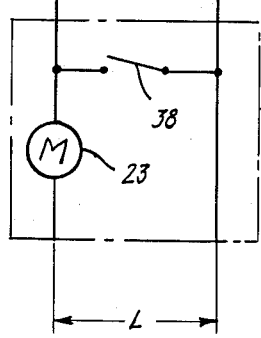
FIG. 1.
FIG. 6.
INVENTORS
HERMANN E. F. C. LINGENBRINK
ALBERT LA BOY
BY
AGENT

AGENT

Dec. 20, 1960   H. E. F. C. LINGENBRINK ET AL   2,965,829
POSITIONING SERVOSYSTEM
Filed Feb. 28, 1957                             3 Sheets-Sheet 3

INVENTORS
HERMANN E. F. C. LINGENBRINK
ALBERT LA BOV
BY

AGENT

United States Patent Office 2,965,829
Patented Dec. 20, 1960

2,965,829
POSITIONING SERVOSYSTEM

Hermann E. F. C. Lingenbrink, Hilltown, and Albert La Bov, Drexel Hill, Pa., assignors to Philco Corporation, Philadelphia, Pa., a corporation of Pennsylvania Filed Feb. 28, 1957, Ser. No. 643,175

4 Claims. (Cl. 318—467)

This invention relates to positioning mechanisms, and more particularly to stepping mechanisms for positioning rotary devices by moving the latter in step-by-step fashion.

The invention has as its broad and primary object to provide a novel and central electro-mechanical mechanism for operating a rotary device step-by-step through predetermined sequential angular increments. Another object of the invention is the provision of such a positioning mechanism which is automatically responsive to momentary closing of a control switch to operate a rotary device, moving it from one position to another, and then to shut itself off.

A further object of the invention is to provide a stepping mechanism which will self-cycle or step through a number of positions automatically.

It is also an object of the invention to provide such apparatus in which the rotary device is capable of being selectively operated either electrically or manually.

A specific object of the invention is the provision of a self-cycling stepping device adapted for remote control, and in which a single control impulse from a remote switch will cause the mechanism to step, or cycle, until a desired predetermined position is reached.

It is a particular object of the invention to provide apparatus suited for remote actuation of the channel selector switches in television receivers.

Another specific object of the invention is to provide such apparatus whereby channel selection is predetermined, yet easily changeable, as desired.

A further and still more specific object of the invention is to provide mechanism of the above-stated type which is simple in construction and operation, easy to adjust, yet is characterized by rugged construction.

In accordance with a preferred embodiment of the present invention, and first briefly described, the mechanism includes a motorized self-cycling drive mechanism which, in response to momentary closing of a starting switch in a power supply circuit, is moved sequentially and step-by-step through predetermined angular increments by a motor, each angular increment in the illustrated embodiment corresponding to a different television channel.

Drive means in the mechanism is so constructed and arranged as to operate means for controlling a switch in the motor circuit to maintain the circuit closed during self-cycling of the drive mechanism, said means including indexing members disposed adjacent each of several detents in a drive wheel, said indexing members being so constructed and arranged as to actuate the switch control mechanism to shut-off the motor when the mechanism is stepped to the next preselected position or channel.

The manner in which the foregoing and other objectives and advantages of the invention may best be achieved will be understood from a consideration of the following detailed description taken together with the accompanying drawings in which:

Figure 1 is a perspective showing of apparatus made in accordance with a preferred embodiment of the invention, and showing the device in an operating position;

Figure 6 is a circuit diagram.

Figure 2:
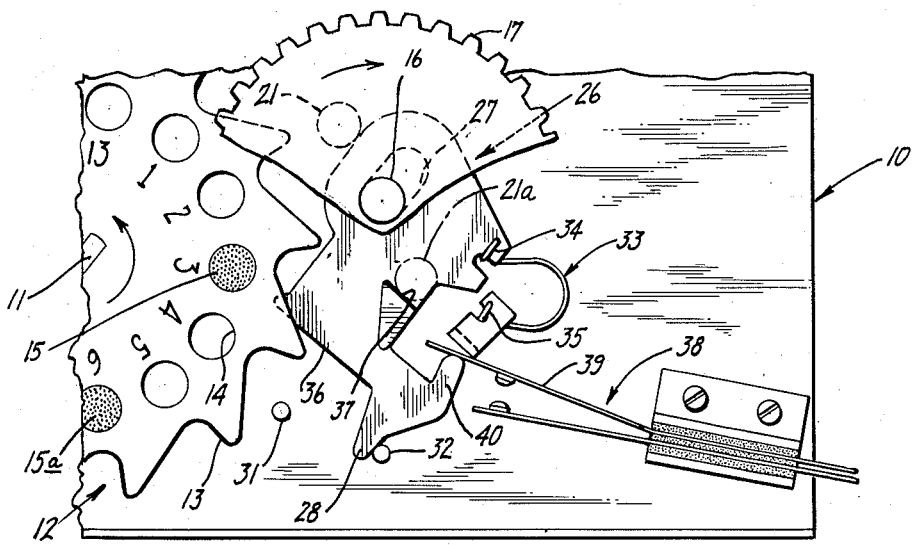
Figures 2, 3, 4 and 5 are views of apparatus shown in Figure 1, on a somewhat enlarged scale with parts broken away, and looking generally in the direction 2—2 thereof.

While in its broader aspects the invention is applicable to a variety of devices to be driven, the following description is with reference to its use as an operating agency for rotary switches of the type used for channel selection in television receivers.

As viewed in Figure 1 the apparatus comprises base plate or frame 10 having journalled therein shaft 11 carrying a drive wheel 12 provided with a number of teeth or slots 13 corresponding to the number of available television channels. The drive wheel is provided, adjacent each slot 13, with apertures 14 adapted to receive indexing pins or stops 15, one being shown in each of the apertures designating channels 3, 6, and 10.

Also journalled in the base plate upon a shaft 16 is movable means comprising a drive gear 17 having associated therewith a drive pin 21 adapted operably to engage slots 13 of drive wheel 12. (See also Figures 3, 4 and 5.) Affixed to the plate by bracket means 22 is motor 23, and affixed to the motor shaft 24 is drive pinion 25 for drive gear 17. The motor shown is of the type having an off-set rotor which, when the motor is energized, centers itself relative to the stator, moving the drive pinion 25 forwardly to a position engaging the drive gear 17, as shown in Figure 1, and thereby rotating the drive pin 21 for engagement with slots 13 (Figures 2, 3, 4, 5) of the drive wheel 12.

Although in the preferred embodiment illustrated a driving gear and pinion is shown, it is to be understood that other suitable means may be employed, for example a friction drive may be employed in place of the gear drive illustrated.

Figure 3:
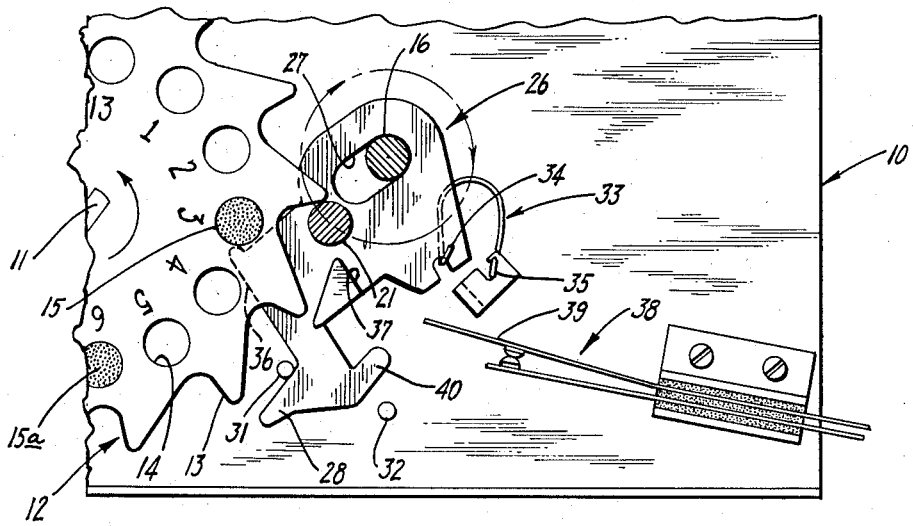
Figure 4:
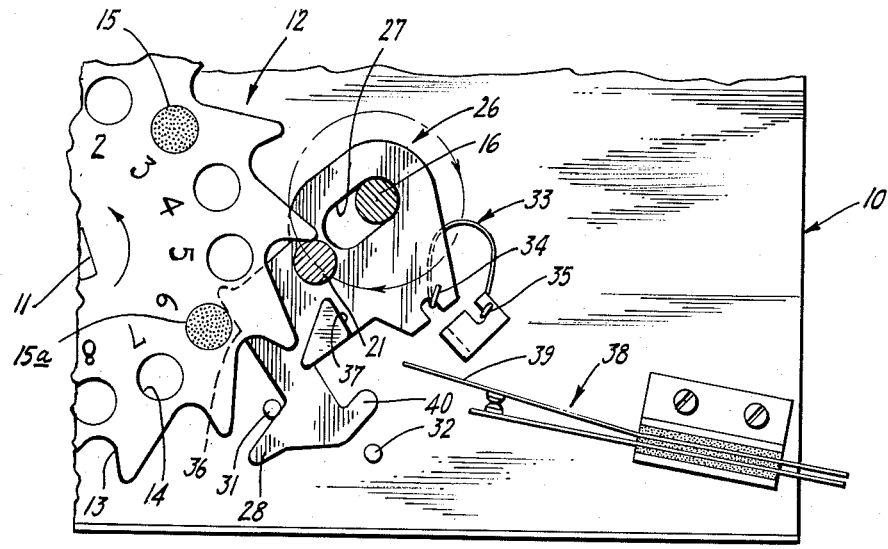
Figure 5:
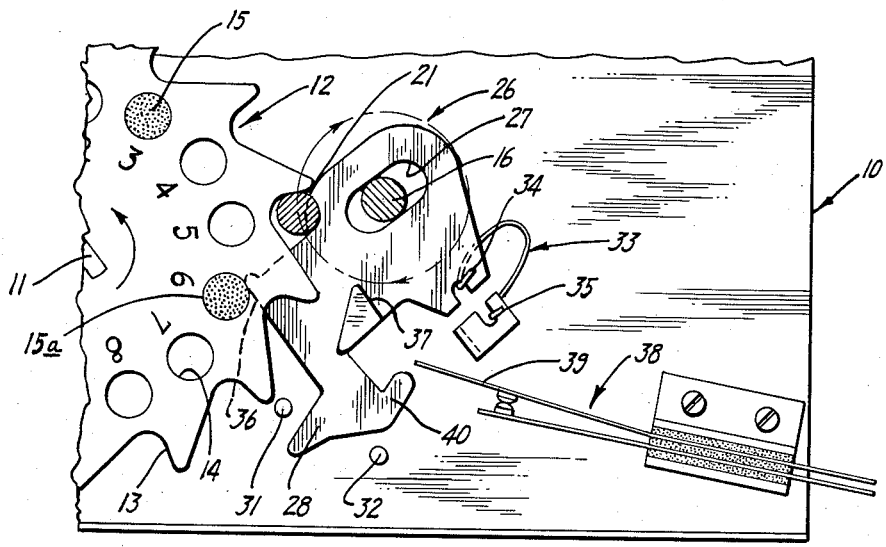

As best seen in Figures 2, 3, 4 and 5, in particular accordance with the invention there is journalled upon drive gear shaft 16 swingable means comprising an oscillatable control lever 26, such journalling being effected by means of slot 27 whereby both rotation and sliding of control lever 26 with respect to drive gear shaft 16 is accommodated. Control lever 26 is movable between left and right hand positions, as best seen in Figures 2, 3, and 4, and such operation will be hereinafter more fully described. In either of these positions the lever is held in cooperation with suitably formed stop pins 31 and 32 engageable with an appendage 28 of the lever, through the action of an over-center spring 33, the latter having one end affixed to suitably formed portions of lever 26, as seen at 34, and having its other end affixed to a suitably formed tab formed in frame 10, as shown at 35. The lever 26 has a cam-like surface portion 36 formed therein and adapted for engagement, in its left hand position (Figure 3), with one of the advancing indexing means or pins 15 carried by the wheel 12 (see 15a, Figure 4). There is also formed in lever 26 an upstanding cam surface 37 which is engageable by the drive pin 21, as best seen in Figures 1 and 2, when the drive pin has moved to the position indicated at 21a (Figure 2), as will be hereinafter more fully described.

Carried by base plate 10 is a holding switch 38 having an operating arm 39 adapted to open or close the switch through contact with a suitably formed cam portion 40 of lever 26.

As diagrammatically shown in Figure 1, the shaft 11 which journals drive wheel 12 to base plate 10 is provided with extensions 41 and 42, the extension 41 having a knob 43 attached thereto for manually rotating the channel selector switch indicated by numeral 44, the latter being affixed to opposite shaft extension 42.

Although the embodiment of the invention illustrated does not include detent means for each indexing position as an integral part of the apparatus, it is to be understood that such means is contemplated as being provided as an integral portion of selector switch 44. It is of course to be understood that any known suitable detent means may be associated with the stepping mechanism, if desired, in order to ensure positive positioning of wheel 12 and shaft means driven thereby.

The motor, as shown in Figures 1 and 6, may be connected in circuitry comprising a suitable source of energy identified by the letter L through either the aforementioned holding switch 38 or through a manually operable control switch 46, said switch being a normally open push button type. The manually operable control switch 46 may be mounted on the cabinet of the television receiver, and while only a single operating switch has been shown, it is understood that any convenient number may be provided, particularly in the event remote control of the stepping apparatus is desired.

In the operation of the apparatus described above, switch 46 (Figure 6) is closed momentarily to energize motor 23, at which time shaft 24 moves forwardly and drive pinion 25 thereon engages drive gear 17, as is clearly shown in Figure 1, and gear 17 is rotated in the direction indicated by arrows (Figures 2 to 5). It will be seen in Figure 2 that the drive pin 21, carried by the drive gear 17, is in its rest or starting position, lever 26 is in its right hand position, switch 38 is in its open position, and wheel 12 is at rest in a position corresponding to number 3 channel. It is of course to be understood that the inertial forces inherent in the system are sufficient to ensure that the drive gear will continue its rotational movement following momentary closing of switch 46, such forces being effective to rotate pin 21 to the position 21a illustrated in Figure 2, whereupon it engages the upstanding cam surface 37 associated with lever 26. For the sake of convenience of illustrating the ensuing positions of drive pin 21 relative to lever 26 and wheel 12, gear 17 upon which pin 21 is mounted is not shown in Figures 3, 4, and 5. As the aforementioned inertial forces carry pin 21, while so engaged, through its arc, the pin forces lever 26, with the assistance of over center spring 33, into its left hand position, as is best seen in Figure 3, the spring being further effective resiliently to urge the lever arm against stop means 31. At the same time the cam surface 40 disengages resilient switch arm 39, thereby permitting the contacts of holding switch 38 to close and hold motor 23 energized.

Referring again to Figure 3, drive pin 21, now motor driven, rotates to such position as to engage a tooth 13, for example the tooth opposite channel 3. Subsequent rotation of the drive pin steps wheel 12 until the next index pin 15a, for example channel 6, as shown in Figure 4, is brought to bear against cam surface portion 36 of lever 26. As pin 21 continues to travel in its prescribed arc, motion imparted thereby to wheel 12 through the engaged tooth 13 causes index pin 15a opposite channel 6, to urge lever 26 toward its right hand position whereby its appendage 28 moves away from the stop means 31. This motion of the lever compresses over-center spring 33 (Figure 5) sufficiently to effect snap-over action of the same, thus forcing the lever arm into its right hand rest position, and urging portion 28 against right hand stop 32, as best seen again in Figure 2, to complete the cycle. Concurrent with such motion of the lever, cam surface 40 is forced against the switch arm 39, thereby opening the switch and deenergizing the motor. The mechanism has, therefore, arrived at a rest position corresponding to channel 6, such position being maintained by detent means (not shown) carried within the switching mechanism 44. It is seen that the wheel 12 locks in with rotary switch means 44 in such manner as to permit disengagement of the drive pin 21 from the last engaged tooth.

It is to be noted that in any indexed rest position of the novel stepping apparatus, for example either channel 3 or 6 as shown, shaft 11 is free to be rotated manually by knob 43.

Having described the operation of the apparatus as between two spaced channel positions, its operation between any two predetermined positions, as established by indexing pins 15, will be fully understood. It should be recognized that the apparatus may be made to cycle past the indexing pins merely by holding the switch 46 closed. Release of the switch will cause the mechanism to stop at the next predetermined position established by one of pins 15. It will, of course, be clear from the foregoing description that selection of the desired channels requires nothing more than insertion of the indexing pins 15 in the proper corresponding apertures.

While a single preferred embodiment has been described, this is not by way of limitation, since it is apparent that modifications may be made in the structure without departing from the invention. For example, the number of teeth 13 may be changed, or the configuration of such teeth, to meet various operating conditions, as desired.

We claim:

1. Actuating mechanism for use in apparatus adapted angularly to position a rotatable shaft, including drive means having an element releasably coupled to said shaft to rotate the same through angular step-by-step increments and indexing means movable in step-by-step fashion with said shaft, said actuating mechanism being operable to energize or deenergize such drive means and comprising: lever means pivotally mounted for movement between a pair of rest positions; first cam means associated with said lever means and disposed for engagement by such releasably coupled element of such drive means to move the lever means, when the latter is in one of said rest positions, to the other of said rest positions, thereby to energize such drive means; and second cam means associated with the lever means and disposed for enagement by such indexing means, while the lever means is in said other rest position to deenergize such drive means.

2. Switch actuating mechanism for use in step-by-step positioning devices of the type including a wheel having tooth means, indexing means, drive pin means for engaging said tooth means to rotate said wheel, a motor for actuating said drive pin means, a power circuit for energizing said motor and including a source of energy and a switch actuatable to open and close such circuit, said actuating mechanism comprising: lever means mounted for combined sliding and pivotal movements between a pair of rest positions and being further disposed for engagement with such switch to actuate the same; a first cam means carried by said lever means and disposed for engagement by such drive pin means, when said lever means is in one of said pair of rest positions, to effect combined pivotal and sliding movement of said lever means to the other of said rest positions actuating such switch means to close such circuit; and second cam means carried by said lever means and disposed for engagement by such indexing means, when said lever means is in said other rest position, to effect combined sliding and pivotal movement of said lever means to the said one rest position thereby actuating such switch means to open such circuit.

3. Switch actuating mechanism for use in a positioning device of the type including a first shaft to be driven through increments in step-by-step fashion, rotatable drive means for said first shaft carried by a second shaft, switch means for energizing and deenergizing said drive means, said switch actuating mechanism comprising: lever means having an elongated aperture disposed for registry with such second shaft providing both for rotatable and for sliding movements of said lever means with respect to such shaft; over-center spring means disposed to urge said lever means, selectively, between a pair of rest positions in which end portions of said elongated aperture abuttingly engage such second shaft, said lever means being disposed for actuating engagement with such switch means as the lever means moves to one of said pair of positions; and an interference member carried b ysaid lever means and operably engageable by such drive means to move the lever means to such position as to provide for the over center spring to urge the latter to its alternate rest position, thereby actuating such switch.

4. Operating mechanism for a switch, comprising: a rotatable driving shaft and a rotatably driven shaft; wheel means carried by said driven shaft and having tooth means and an indexing pin spaced from and extending in the direction of the axis of said driven shaft; a drive pin movable by said driving shaft and disposed to engage said tooth means to drive said wheel means; and lever means mounted on said driving shaft for combined pivotal and slidable movements about said shaft, and between a pair of rest positions to actuate such switch, said lever means being disposed for operative engagement by said indexing pin when in one of said rest positions for movement to its other position, and said lever means when in the said other position being disposed for operative engagement by said drive pin to move to its said one position.

References Cited in the file of this patent

UNITED STATES PATENTS

| | | |
|---|---|---|
| 2,598,448 | Schultz | May 27, 1952 |
| 2,760,139 | Luebking | Aug. 21, 1956 |
| 2,795,150 | Seider | June 11, 1957 |
| 2,833,976 | Kennedy et al. | May 6, 1958 |

OTHER REFERENCES

James and Markle: Controller for Electric Motor, Second edition, p. 87, Fig. 6-25, McGraw-Hill, New York, 1952.